US012555117B2

(12) United States Patent
Wall

(10) Patent No.: US 12,555,117 B2
(45) Date of Patent: Feb. 17, 2026

(54) ARCHITECTURES, SYSTEMS, AND METHODS FOR CARD BASED TRANSACTIONS

(71) Applicant: Stripe, Inc., South San Francisco, CA (US)

(72) Inventor: Jonathan Wall, San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 18/373,845

(22) Filed: Sep. 27, 2023

(65) Prior Publication Data

US 2024/0020702 A1 Jan. 18, 2024

Related U.S. Application Data

(63) Continuation of application No. 16/523,528, filed on Jul. 26, 2019, now Pat. No. 11,790,372.

(51) Int. Cl.
*G06Q 20/40* (2012.01)
*G06Q 20/34* (2012.01)
(Continued)

(52) U.S. Cl.
CPC ....... *G06Q 20/4018* (2013.01); *G06Q 20/341* (2013.01); *G06Q 20/3827* (2013.01);
(Continued)

(58) Field of Classification Search
CPC ............ G06Q 20/341; G06Q 20/3829; G06Q 20/4018; G06Q 20/409; G06Q 20/425; G06Q 20/3827
See application file for complete search history.

(56) References Cited

U.S. PATENT DOCUMENTS

| 5,530,887 A | 6/1996 | Harper et al. |
| 8,954,740 B1 | 2/2015 | Moscaritolo et al. |
| (Continued) | | |

FOREIGN PATENT DOCUMENTS

| CA | 3073981 A1 | 3/2019 |
| CN | 105556553 A | 5/2016 |
| (Continued) | | |

OTHER PUBLICATIONS

Kumar, Algorithms for provisioning virtual private networks in the hose model, IEEE, Aug. 2002, vol. 10 (4), p. 565-578.*

(Continued)

*Primary Examiner* — Ilse I Immanuel
(74) *Attorney, Agent, or Firm* — Foley & Lardner LLP

(57) ABSTRACT

A method and apparatus for processing a transaction between a merchant and a customer of the merchant are described. The method may include generating, at an ingress server, an initial transaction message by generating a deterministic identifier for a card used in the transaction from card data received for the transaction and encrypting the received card data. The method may also include providing the initial transaction message from the ingress server to a payment server. Furthermore, the method may include updating, by the payment server in response to an authorization of the transaction determined based at least in part on the deterministic identifier for the card, the initial transaction message with authorization data, and providing the updated initial transaction message from the payment server to an egress server. The method may also include communicating a final transaction message to an authorization system for processing the transaction between the merchant and the customer based on the card data.

17 Claims, 11 Drawing Sheets

(51) Int. Cl.
*G06Q 20/38* (2012.01)
*G06Q 20/42* (2012.01)

(52) U.S. Cl.
CPC ....... *G06Q 20/3829* (2013.01); *G06Q 20/409* (2013.01); *G06Q 20/425* (2013.01)

(56) References Cited

U.S. PATENT DOCUMENTS

| | | | |
|---|---|---|---|
| 9,830,596 | B2 | 11/2017 | Collison et al. |
| 9,913,141 | B2 | 3/2018 | Ulrich et al. |
| 10,659,379 | B2 * | 5/2020 | Bonig ............... H04L 51/18 |
| 10,986,031 | B2 * | 4/2021 | Bonig ............... H04W 4/023 |
| 2004/0052377 | A1 | 3/2004 | Mattox et al. |
| 2009/0245515 | A1 | 10/2009 | Bond et al. |
| 2012/0143770 | A1 | 6/2012 | Pauker et al. |
| 2013/0018795 | A1 * | 1/2013 | Kolhatkar ......... G06Q 20/4016 705/44 |
| 2013/0018796 | A1 * | 1/2013 | Kolhatkar ........... G06Q 20/405 705/44 |
| 2014/0164254 | A1 | 6/2014 | Dimmick |
| 2015/0019443 | A1 * | 1/2015 | Sheets ............... G06Q 20/3829 705/71 |
| 2017/0048708 | A1 | 2/2017 | Ulrich et al. |
| 2018/0199197 | A1 | 7/2018 | Ulrich et al. |
| 2018/0225653 | A1 | 8/2018 | Vokes et al. |
| 2019/0005499 | A1 | 1/2019 | Wall et al. |
| 2019/0019169 | A1 | 1/2019 | Mclaughlin et al. |
| 2019/0205993 | A1 | 7/2019 | Rodriguez et al. |
| 2020/0036809 | A1 | 1/2020 | Ulrich et al. |

FOREIGN PATENT DOCUMENTS

| | | | | |
|---|---|---|---|---|
| EP | 3373556 | A1 * | 9/2018 | ......... H04L 41/5054 |
| JP | S62-237570 | A | 10/1987 | |
| JP | 2011-034556 | A | 2/2011 | |
| JP | 2012-244380 | A | 12/2012 | |
| JP | 2016-525254 | A | 8/2016 | |

OTHER PUBLICATIONS

1st Examiner's Requisition dated Apr. 4, 2024 for CA App. 3,148,809 (4 pages).

Nur Abdullah, Geography and Routing in the Internet, ACM transactions on spatial algorithms and systems, 2018, vol. 4 (4), p. 1-16.

Office Action dated Apr. 1, 2024 on JP Appl. 2018/0225653 (3 pages incl. English translation).

First Office Action on CN Application 202080054189.6 dated Apr. 7, 2025 (7 pages).

Office Action on JP App. 2024-172141, dated Jun. 25, 2025 (7 pages incl. English Translation).

\* cited by examiner

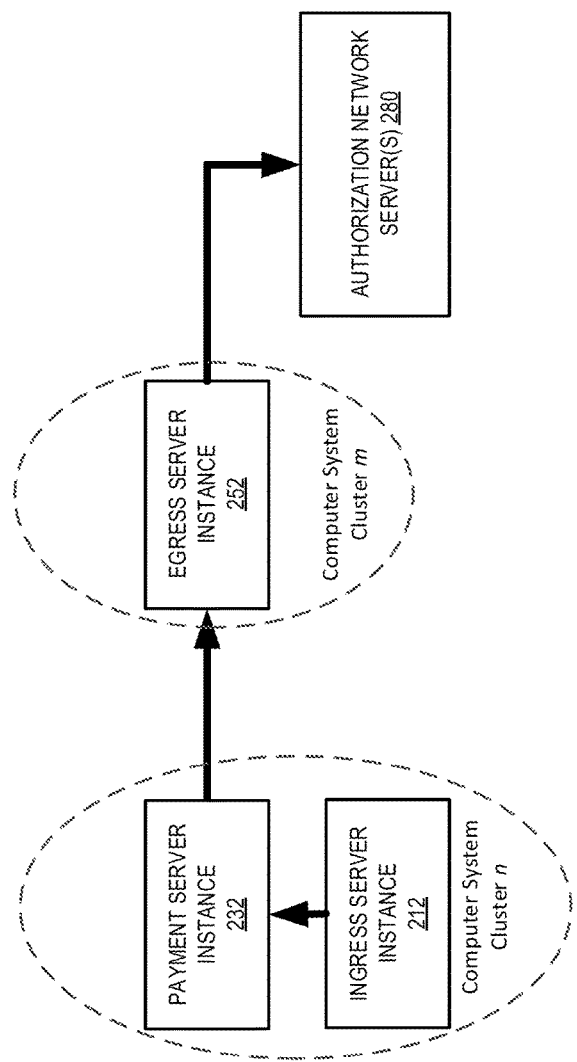
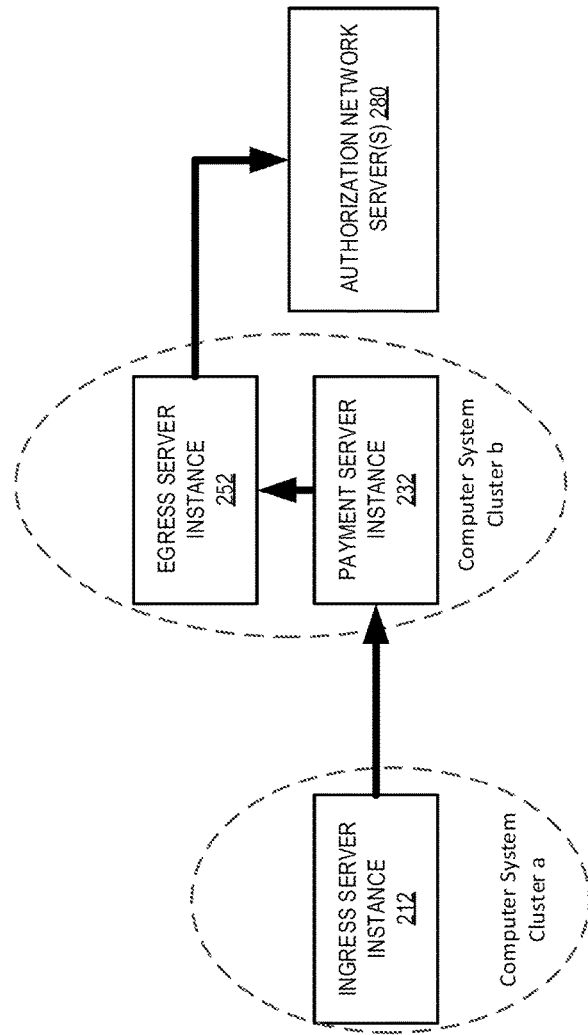
FIG. 2D
FIG. 2E

ARCHITECTURES, SYSTEMS, AND METHODS FOR CARD BASED TRANSACTIONS

PRIORITY

The present application claims the benefit of, and is a continuation of U.S. patent application Ser. No. 16/523,528, filed Jul. 26, 2019, which is incorporated by reference in its entirety.

BACKGROUND

Merchants, such as grocers, car services, dry cleaning services, etc., provide their products and services to customers for a fee. To collect fees for products or services provided, a merchant will typically enter an amount to be collected in a point of sale (POS) device, the POS device will communicate this data to a card reader, and the card reader will collect card data, such as Europay, Mastercard, Visa, etc. data collected from a credit, debit, gift card, electronic benefits, or other payment instrument provided by the customer. In order to collect the card data, a magnetic strip or an integrated circuit of the card is read by a card reader. That card data is then used by the POS device and/or the card reader to authorize the transaction, for example using the services of a payment processing system that communicates with banks and/or card providers to approve and charge the fees for the merchant for the transaction. Such a transaction can be referred to as a card present transaction, as the card reader used by the merchant collects data from a customer's card at the time of sale. Similarly, card data may be entered into a POS device, mobile application, kiosk, etc., for example via a graphical user interface, without collecting card data from a card or presenting the card to a merchant's representative during a transaction. Such a transaction is referred to a card not present transaction, as the card data is not physically collected or inspected by the merchant.

The card data in either of these types of card based transactions is then typically provided from the card reader, POS device, merchant app, etc. to the payment processing system using a communications network, such as the internet. Risk is introduced into these transactions by transmitting the card data, even if encrypted, over a public network, which may be intercepted by a nefarious actor. Additionally, storage, use, and forwarding of the card data by the payment processing system, such as storing a collection of card data in a repository and further transmitting the card data to other systems (e.g., banks, card providers, etc.) over the communications network, is a point of weakness where public facing interfaces of the payment processing system can be exploited.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIGS. 2B-2F are block diagrams of different architectures for the distributed execution of an ingress server instance, a payment server instance, and an egress server instance.

DETAILED DESCRIPTION

Figure 1:
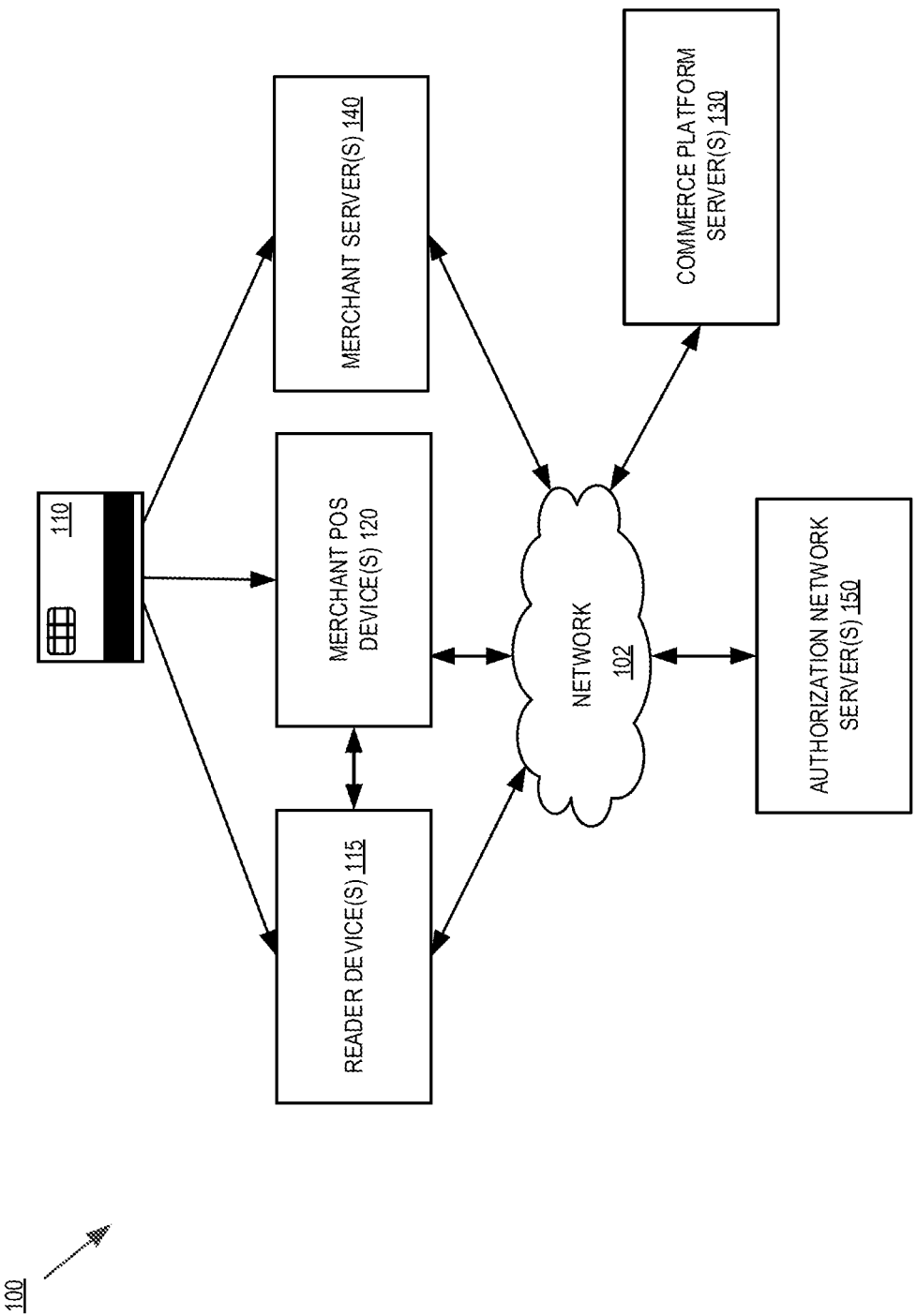
FIG. 1 is a block diagram of an exemplary system for card based transactions by commerce platform server(s).

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "providing", "encrypting", "decrypting", "selecting", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 for card based transactions by commerce platform server(s) 130.

Figure 8:
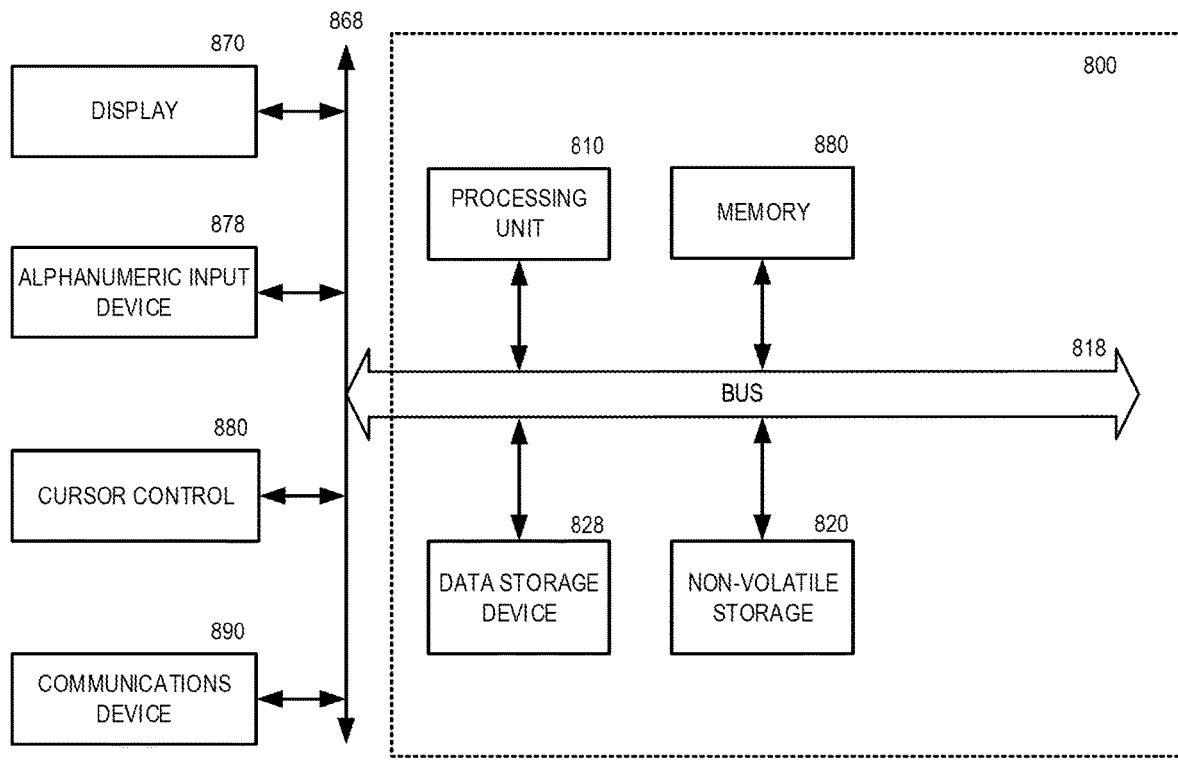
FIG. 8 is one embodiment of a computer system that may be used to support the systems and operations discussed herein.

In one embodiment, the system 100 includes one or more reader devices 115, one or more merchant point of sale (POS) devices 120, one or more merchant servers 140, one or more commerce platform servers 130, and one or more authorization network servers 150. In one embodiment, merchant POS devices 120 may be computing devices, such as a smartphone, tablet computer, laptop computer, computerized, or other hardware devices that include typical computing hardware, as illustrated in FIG. 8. Furthermore, merchant POS device(s) 120 may be configured to implement a payment application of a merchant that enables an employee or agent of the merchant to collect payment and complete transactions for goods or services offered by the merchant, such as by entering card data into the payment application. In embodiments, the application may be a web based application served by one or more of the merchant server(s) 140 or other computer servers (not shown), as well as a web based application capable of being run on a user device (e.g., a smart phone running a smart phone application, a tablet running a tablet application, etc.).

Furthermore, merchant server(s) 140, authorization network server(s) 150, and commerce platform server(s) 130 are also computing devices, such as server computers, desktop computers, etc. that include typical computing hardware, as illustrated in FIG. 8 below.

Additionally, reader device(s) 115 are also computer processing devices that are each communicatively coupled with one of the merchant POS device(s) 120 over a wireless communications link, such as a Bluetooth, Zigbee, WLAN, etc., or a wired communications link, such as a LAN, WAN, Ethernet, etc.

Figure 9:
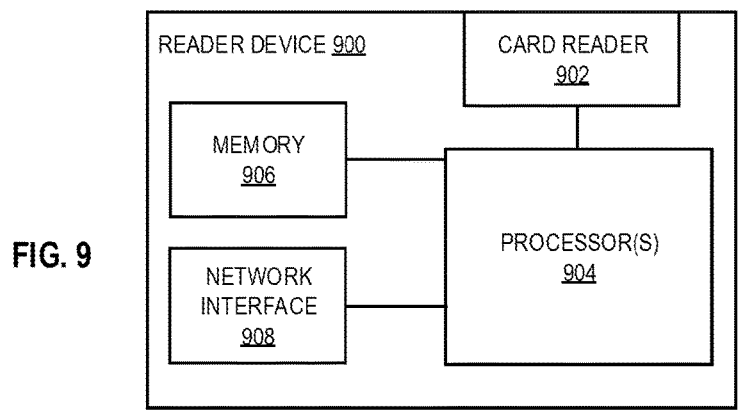
FIG. 9 is one embodiment of a reader device that may be used to support the systems and operations discussed herein.

In embodiments, the reader devices 115 can include a card reader 902 (e.g., an integrated circuit or smart chip reader, a magnetic strip reader, a near field communication reader, etc.), one or more processor(s) 904, memory 906, a network interface 908 for establishing local or wide are communication links, and at least one processor 908, as well as other hardware components typically associated with mobile reader devices (e.g., pin pad, display screens, buttons, touch pads, etc.), as illustrated in FIG. 9.

In embodiments, a reader device interacts with a merchant POS device to which it is communicably coupled to perform transactions using the services of commerce platform server(s) 130, such as financial transaction processing operations using card data. The reader device(s) 115 are responsible for collecting consumer payment card data (e.g., EMV card data, magnetic strip data, or other card data) by scanning a magnetic strip, reading an integrated circuit, etc. of a payment card 110 for a card based transaction between a merchant and a customer of the merchant. Once card data is read by a reader device 115, the card data is provided by the reader device to the commerce platform server(s) 130 via network 102 for performing one or more payment processing operations. In an embodiment, this can include one or more of tokenizing, authorizing, and/or approving one or more financial aspects associated with the transaction using a distributed architecture that strictly controls communication flow and provides card data protection, as discussed in greater detail herein. In other embodiments, card data may be collected by a merchant POS device, such as by entry of card data into a user interface at the merchant POS device(s) 120. In yet other embodiments, card data for a transaction may be received by merchant server(s) 140, such as from a mobile application interface, web based interface, etc. in which a user enter their card data into the interface. I In embodiments, communication is established between the reader device(s) 115, merchant POS device(s) 120, and/or merchant server( ) 140 and commerce platform server(s) 130 for handling any received card data in such a way that it is not exposed to any merchant system (e.g., merchant POS device(s) 120 and merchant server(s) 140) thereby preventing merchant software running a POS checkout application, mobile application, the merchant server(s) 140, etc. from being subject to the scope of PCI compliance requirements. Instead, a token is generated by commerce platform server(s) 130 after authorizing a transaction with risk assessment systems of the commerce platform server(s) 130 and/or after clearing the transaction with authorization network(s) 150 (e.g., card brand systems and issuing bank systems), and the token provided form the reader device 115 to the merchant system handling the transaction. The merchant's system handling the transaction may then use the token authorizing the transaction to complete the transaction with the customer, and further provide the token to merchant server(s) 140 for subsequent use in obtaining remuneration identified by the token by interacting with the commerce platform server(s) 130. One embodiment for using reader devices with merchant POS devices is described in U.S. patent application Ser. No. 15/997,416, filed on Jun. 4, 2018, titled "Managed Integrated Payment Environment," the disclosure of which is incorporated by reference in its entirety. Furthermore, one embodiment of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety.

The reader device(s) 115, merchant POS device(s) 120, merchant server(s) 140, commerce platform server(s) 130, and authorization network server(s) 150 may be coupled to a network 102 and communicate with one another using any of the standard protocols for the exchange of information. However, due to the sensitive nature of the card data being exchanged during card based financial transactions, in embodiments, the reader device(s) 115, merchant POS device(s) 120, merchant server(s) 140, commerce platform server(s) 130, and authorization network server(s) 150 may communicate with each other as discussed herein using protocols for the secure exchange of information, such as Transport Layer Security (TLS), Secure Sockets Layer (SSL), Secure Shell (SSH), etc. In embodiments, one or more of the reader device(s) 115, merchant POS device(s) 120, merchant server(s) 140, commerce platform server(s) 130, and authorization network server(s) 150 may run on one Local Area Network (LAN) and may be incorporated into the same physical or logical system, or different physical or logical systems. Alternatively, one or more of the reader device(s) 115, merchant POS device(s) 120, merchant server(s) 140, commerce platform server(s) 130, and authorization network server(s) 150 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, processing nodes of commerce platform server(s) 130 may reside on a single server, or be distributed among different servers, coupled to other devices via a public network (e.g., the Internet) or a private network (e.g., LAN). In embodiments, a plurality of commerce platform systems executed by commerce platform server(s) 130 are configured for performing discrete stages of card based transaction payment processing in response to receiving card data and other data (e.g., user identifiers, PIN numbers, transaction amounts, merchant identifiers, etc.) for a transaction from reader device(s) 115, merchant POS device(s) 120, and/or merchant server(s) 140. In embodiments, as discussed herein, the different commerce platform systems executed by commerce platform server(s) 130 can include an ingress system (e.g., instance of an ingress server) for accepting new card based transactions and generating an initial transaction message including an encrypted version of card data used for the transaction and a deterministic card identifier, a payment system (e.g., an instance of payment server) for performing an initial authorizing of a transaction based on risk assessment and then tokening the transaction, and an egress system (e.g., an instance of an egress server) for decrypting the encrypted card data and generating a final transaction message, such as an ISO 8583 message, for communicating to authorization network server(s) 150 (e.g., that clear and provide payment associated with the card used in the transaction). Each of the ingress servers, payment servers, and egress servers, and the processes performed by each to protect card data communicated between the servers, provide a distributed architecture that enforces strict communication protocols and flows to improve commerce platform data protection for card data, increase efficiency of transaction processing, and provide a continuously active (e.g., active active) architecture for maintaining transaction processing even in the event of server failures, are discussed herein.

As will be discussed in greater detail herein, the encryption and deterministic identification techniques, information flow control, and distribution of commerce platform transaction systems may be utilized during card present, card not present, and other types of transactions in which sensitive customer information is exchanged using network based communications.

Figure 2A:
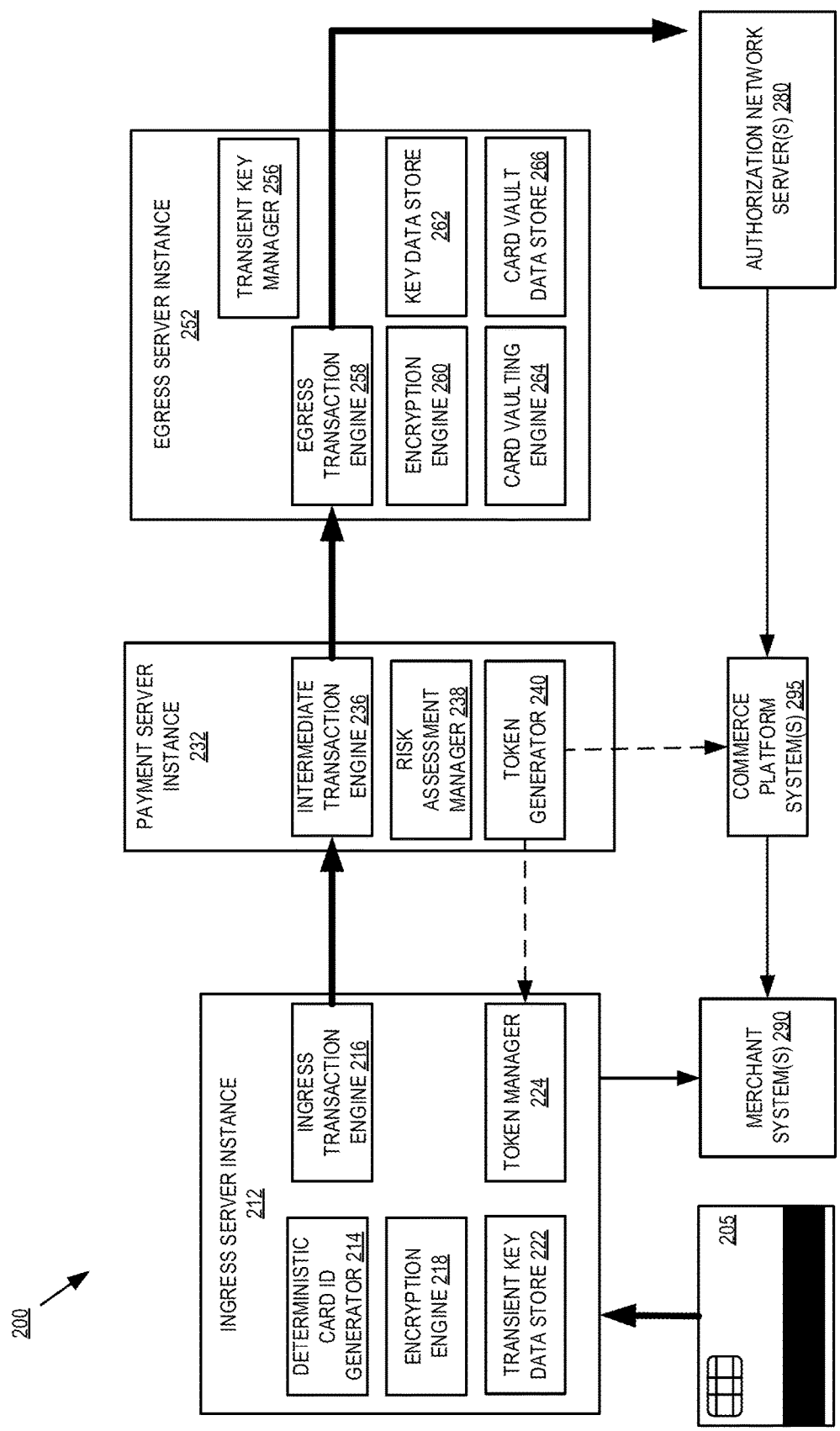
FIG. 2A is a block diagram of one embodiment of a distributed architecture of a commerce platform including an instance of an ingress server, an instance of a payment server, and an instance of an egress server that provides controlled flow of network communications during a transaction.

FIG. 2A is a block diagram of one embodiment of a distributed architecture 200 of a commerce platform including an instance of an ingress server, an instance of a payment server, and an instance of an egress server that provides controlled flow of network communications during a card based transaction. In embodiments, ingress server instance 212, payment server instance 232, and egress server instance 252 may each be an application, a virtual machine, a virtualized server, etc. executed by one or more computer system(s), such as one or more computer system clusters as illustrated in FIGS. 2B-2F and discussed in greater detail below. Furthermore, although only one of each of ingress server instance 212, payment server instance 232, and egress server instance 252 are illustrated, a plurality of each of ingress server instance 212, payment server instance 232, and egress server instance 252 may be distributed and executed simultaneously to provide continuous availability of the transaction processing capabilities discussed herein.

In embodiments, ingress server instance 212, payment server instance 232, and egress server instance 252 are each responsible for performing operations in different stages of processing a card based transaction between a merchant and a customer of the merchant. The different phases represent the taking in of card data by the ingress server instances 212, for example, from a card reader used by a merchant, from mobile application distributed by the merchant, etc., and then obfuscating that card data in a deterministic way that may be communicated to payment server instance 232 in an initial transaction message. The payment server instance 232 may then receive the obfuscated card data in the initial transaction message, which as discussed in greater detail below includes at least a deterministic identifier for the card and an encryption of sensitive card data (e.g., card number, card type, card security code, personal identification number, as well as other card data), and then perform various processes that occur before sending card data to authorization networks including tokenizing the transaction, performing risk assessment, etc. Once completed, the payment server instance 232 sends the initial transaction message to egress server instance 252 for decrypting the sensitive card data before forwarding a final transaction message to one or more authorization network server(s) (e.g., bank and/or card issuing servers) for clearing or completing the transaction.

Each of the processes performed by the ingress server instance 212, payment server instance 232, and egress server instance 252 are separated from other server instances and follow a strict direction of communication of card data. Such separation of processes enables each server instances to provide security from unwanted, and potentially nefarious sources. That is, payment server instances only receive incoming communications from ingress server instances, and egress server instances only receive incoming communications from payment server instance 232. This serves at least two purposes, such as providing layers of separation between the ingress server instances, which communicates with merchant systems over a public network for performing transactions, and the egress server instances, which should not receive communications from any system other than a payment server instance. Receipt of other communications, especially those from public networks, can be blocked to prevent unwanted access to the sensitive information maintained by egress server instances. Furthermore, the egress server instances may store card data in encrypted form in a card vault data store 266. By separating the egress server instance from the ingress server instance and enforcing the strict communication flow, the sensitive card data is removed as far as possible from public access (e.g., merchant systems and pubic network access) to the card vault and/or encryption keys as discussed herein. Additional benefits, such as instantiating instances of the ingress and egress servers geographically close to merchant system(s) 290 and authorization network server(s) 280, respectively, improves latency in communications between such systems, which in turn increases the speed in which card based transaction systems may process and clear the transactions.

The operations performed by each of the ingress server instance 212, payment server instance 232, and egress server instance 252 are discussed in greater detail below.

In embodiments, ingress server instance 212 is one of a plurality of ingress server instances instantiated and executed by one or more computer systems clusters). In embodiments, prior to taking in data for card 205, ingress server instance 212 receives and stores one or more encryption keys in transient key data store 222. The encryption keys may include one or more public asymmetric encryption keys associated with private asymmetric encryption keys generated by egress server instance's 252 transient key manager 256. In embodiments, ingress server instance 212 periodically receives updated encryption keys, such as hourly, daily, weekly, etc., to limit the time effectiveness of the encryption keys. Thus, when ingress server takes in card data for card 205 of a customer of merchant, such as card data read by a card reader associated with merchant system(s) 290, encryption engine 218 encrypts the sensitive card data upon ingress.

Furthermore, upon taking in data for card 205, non-sensitive card data, such as the primary account number (PAN), is used by deterministic card ID generator 214 of ingress server instance 212 to generate a universal identifier for card 205. In embodiments, the universal identifier, which is referred to herein as a deterministic identifier for the card is generated such that no card data is revealed from the deterministic identifier, and other entities (e.g., egress server instance 252, other trusted commerce platform systems (not shown), etc.) can regenerate the deterministic identifier from the non-sensitive card data. Furthermore, the deterministic identifier, which does not reveal sensitive card data, may be used as an identifier for processes, such as risk assessment and tokenization performed by payment server instance 232, as well as card vaulting performed by egress server instance 252, discussed in greater detail below.

In one embodiment, deterministic card ID generator 214 utilizes a salt selector to select a cryptographic salt (e.g., random data used as additional input in a one way function, such as a destructive hash function) from a large table of cryptographic salts maintained by deterministic card ID generator 214. The table of cryptographic salts may be pre-generated and included in each of the ingress server instances, payment server instances, and egress server instances at instantiation/boot up. Then, the PAN may be provided as an input to a salt selector function, such as a function that randomly distributes PANs to the table of salts, for a repeatable selection of a cryptographic salt from the table. Deterministic card ID generator 214 then performs a hashing function using card's 205 PAN and the selected cryptographic salt, for example computing $f_{hash}(PAN, f_{salt}(PAN))$, to generate the deterministic identifier. Optionally, a recursive and distributed hashing function may be employed such that a card reader may perform an initial set of hashing, such as $f_{n0 \to m}(PAN, f_{salt}(PAN))=identifier_{initial}$, and deterministic card ID generator 214 performs additional hashing, such as $f_{hm \to n}(identifier_{initial})$, where m and n are predefined integers greater than 0. Although hashing is described above, any one-way function where the input (e.g., the PAN) cannot be regenerated from the output of the function can be used by the deterministic card ID generator 214. Additionally, the reader device may optionally encrypt card data and/or the deterministic identifier to further obfuscate this data until it enters the trusted ingress server instance 212, which encryption engine 218 may decrypt for use consistent with the discussion herein.

Ingress transaction engine 216 uses the deterministic identifier and the encrypted card data to generate an initial transaction message for the card based transaction. In one embodiment, the initial transaction message includes a string that includes the deterministic card identifier, as well as other data utilized for card based transactions. In one embodiment, the string may include at least:

<encoding_version>_<first6>_<last4>_<deterministic_
    identifier>_<encrypted_card_data> where first6 represent card data, such as major industry identifier, issuer identification number, bank identification number, etc., the last 4 includes validation and other information, the deterministic identifier is generated as discussed above, and the encrypted data is encrypted sensitive data using a transient encryption key. In another embodiment, an extensible object, such as:

```
message Stub{
    optional string vault_id = 1; //used to retrieve object from vault
    optional int32 first_six = 2; //int encoding of first six
    optional int32 last_four = 3; //int encoding of last four
    enum Network {
        VISA = 1;
        MC = 2;
        //etc.
    }
    enum Issuer {
        CHASE = 1;
        CITI = 2;
        //etc.
    }
    enum Origin Region {
        US = 1;
        Canada = 2;
        //etc.
    }
    enum Attributes {
        PREPAID = 1;
        FSA = 2;
        //etc.
    }
    //enum of additional objects
}
``` may be used in transaction messages. Furthermore, the object discussed above is extensible to include any number of card data and/or transaction attributes.

The attributes, such as definition of card network, issuer, origin region, etc., may include data used during transaction processes (e.g., to define which authorization network server to forward a transaction to by egress server instance 252), as well as to select transaction processing optimizations, such as selecting among different egress instances so that a selects egress instance is at a relevant location by geography, a location specified by legal constraints, is proximate to authorization network server, etc.

Ingress transaction engine 216 then transmits, for example using a secure communications protocol (e.g. TLS, SSL, SSH, etc.), the initial transaction message to intermediate transaction engine 236 of payment server instance 232. In embodiments, ingress transaction engine 216 may select among a plurality of payment server instances using the card data and additional transaction data discussed above to, for example, to select a payment server instance associated with a likely egress server instance, for network communication proximity between a payment server instance associated with a likely egress server instance, for a payment server instance associated with a card type, transaction type, bank, etc., for load balancing purposes, as well as other factors that may be used to select a payment server instance.

In one embodiment, payment server instance 232 utilizes risk assessment manager 238 to perform a risk assessment based on transaction factors, such as transaction amount, transaction origination location, etc. using the deterministic identifier generated for card 205. That is, risk assessment manager 238 consults its own risk assessment system or other risk assessment system utilizing the deterministic identifier so as not to inadvertently provide card data outside of the payment server instance 232. When the risk assessment manager 238 determines that the transaction can proceed, token generator 240 generates a token (e.g., a non-sensitive data element that is a substituted identifier for the transaction). The token may then be returned to ingress server instance, which in turn provides the token to merchant system(s) 290. However, token generator 240 may provide the token to another system of commerce platform system(s) 295 to communicate the token to merchant system(s) 290. The token may then be used by the commerce platform and the merchant system(s) to reference the transaction when, for example, receiving indication that a transaction has been approved, receiving payment for a cleared transaction, etc., where transaction tokenization is discussed in greater detail in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety. As discussed herein, the tokenization of the transaction and the transmission of card data from the reader to the ingress server instance 212 removes the merchant system(s) (e.g., POS devices, cash registers, rewards servers, merchant apps, merchant web based interfaces, etc.) from PCI compliance requirements.

Intermediate transaction engine 236 then forwards the initial transaction message, optionally with authorization data generated during the risk assessment, to egress transaction engine 258, again utilizing a secure communications protocol. Encryption engine 260 may then access the key data store 262 to locate an appropriate key (e.g., based on time of originated transaction, deterministic ID, ingress identifier for the ingress server instance that encrypted the card data, etc.) for decrypting the sensitive data in the initial transaction message. In one embodiment, card vaulting engine 264 uses the decrypted card data, such as the full card data, card security code, name on card, etc. to populate an entry in card vault data store 266. In embodiments, each entry in the card vault data store is encrypted, and the deterministic identifier (e.g., generated from the PAN) for the card is used to index/access the entries in the encrypted card vault. In embodiments, the vault is utilized by egress server instances 252 to store credit card information to, for example, increase the efficiency of follow on transactions, for card not present transactions associated with card 205, etc.

In one embodiment, egress transaction engine 258 further generates a final transaction message for communicating the transaction information to authorization network server(s) 280 (e.g., issuing banks and card issuing servers). In one embodiment, the final transaction message is a PCI compliant message using the ISO 8583 protocol. When the transaction is authorized/cleared by the authorization network server(s) 280 one or more of the authorization network server(s) 280 may communicate the authorization to commerce platform system(s) 295, which uses the token to indicate the clearing/final authorization of the transaction, provide remuneration to the merchant system(s) 290, etc.

In embodiments, ingress server instance 212, payment server instance 232, and egress server instance 252 follow a strict data flow for a card based transaction between a merchant and a customer of the merchant. The strict data flow separates certain operations into each of ingress server instance 212, payment server instance 232, and egress server instance 252. Furthermore, each of ingress server instance 212, payment server instance 232, and egress server instance 252 utilize the transaction messages and deterministic identifier to perform their respective transaction operations to minimize usage of sensitive card data in unprotected form. Additionally, no state data need be maintained using the data flow and processing techniques discussed herein, and therefore each of ingress server instance 212, payment server instance 232, and egress server instance 252 perform transaction processing in a stateless manner. Furthermore, the strict data flow, where a public network accesses ingress server instance 212, payment server instance 232 only receives communications from ingress server instance 212, egress server instance 252 only receives communications from payment server instance 232, and egress server instance 252 communicates a PCI compliant transaction message to an authorization network, network controls that prevent unwanted and possibly nefarious network traffic from entering the servers can be enforced. This is especially beneficial for egress server instances, which are greatly removed from the public network and only ingest certain traffic from certain trusted sources (e.g., payment server instances) to greatly enhance protection of the sensitive data in the card vault data stores.

Figure 2B:
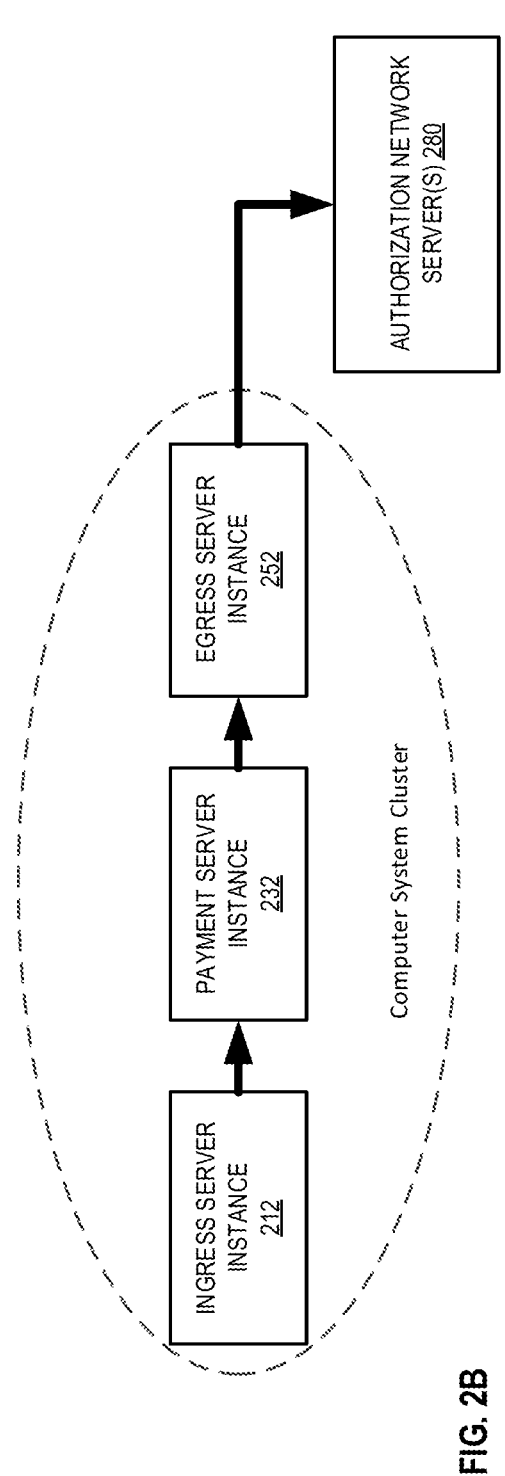
Figure 2C:
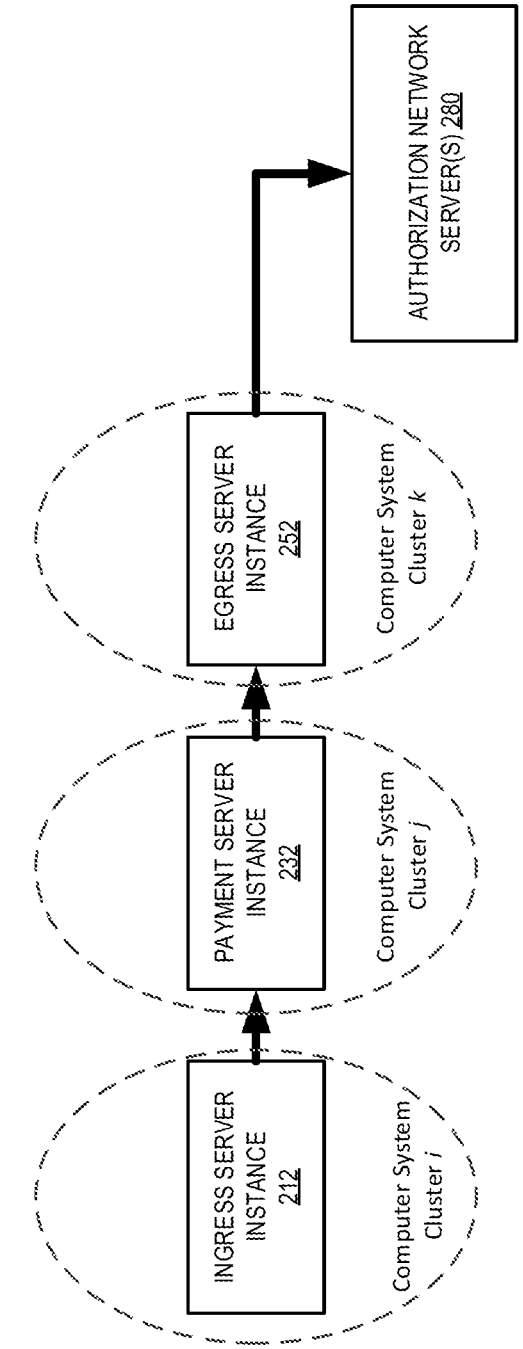
Figure 2F:
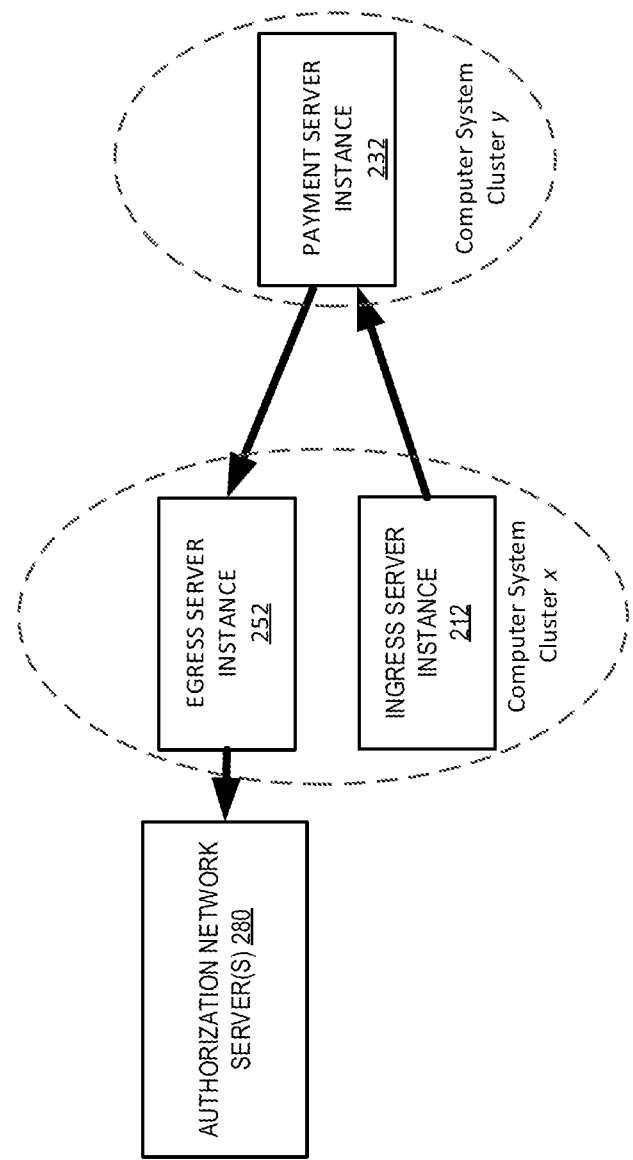

In embodiments, different distributed execution scenarios for the ingress server instance 212, payment server instance 232, and egress server instance 252 are illustrated in FIGS. 2B-2F. By utilizing the encryption and unique deterministic card identifier techniques, and communication flow enforcement discussed above, sensitive card data security is maintained in each scenario. In one embodiment, each of ingress server instance 212, payment server instance 232, and egress server instance 252 may be executed within the same cluster of computing systems, as illustrated in FIG. 2B and may be executed by the same or different computer system(s) within that cluster. In another embodiment, ingress server instance 212, payment server instance 232, and egress server instance 252 are each executed in a different cluster of computer systems, as illustrated in FIG. 2C. In yet another embodiment, ingress server instance 212 and payment server instance 232 may be executed in the same computer system cluster, while egress server instance 252 may be executed in a different computer system cluster, as illustrated in FIG. 2D. In yet another embodiment, ingress instance may be executed in a computer system cluster, whereas both egress server instance 252 and payment server instance are executed in a different computer system cluster, as illustrated in FIG. 2E. In yet another embodiment, ingress server instance 212 and egress server instance 252 may be executed in the same computer system cluster, and payment server instances 232 may be executed in a different computer system cluster, as illustrated in FIG. 2F.

In embodiments, the different clusters in which ingress server instance 212, payment server instance 232, and egress server instance 252 are executed may be selected based on geographic proximity to, for example, merchant system(s)

290 and/or authorization network server(s) 280. For example, as illustrated in FIG. 2C, cluster i may be selected for execution of ingress server instances 212 based on a geographic proximity between cluster i and merchant system(s) 280, whereas egress server instances 252 of cluster k may be selected for a transaction based on a geographic proximity between cluster k and authorization network server(s) 280 Other selection techniques, such as authorization network requirements, legal constraints, load balancing, cluster capabilities, computing cost for clusters, network diagnostics, projected availability, etc. may be used to select which computer systems cluster(s) are selected, which server instances are selected per cluster, and how many instances of each server are instantiated. Furthermore, because the present techniques are utilized to ensure continuous (active active) availability of the services of a commerce platform, any combination of the scenarios described and illustrated in FIGS. 2B-2F may be performed simultaneously utilizing a plurality of distributed ingress server, payment server, and egress server instances based on current requirements of the commerce platform and the merchants and/or authentication server it is interacting with.

For example, ingress server instance 212 may be executed by a cluster of computer systems geographically proximate to merchant system(s) 290 to improve speed of communications between ingress server instance 212 and merchant system(s) 290, whereas egress server instances 252 may be executed by a different cluster of computer systems geographically proximate to authorization network server(s) 280 to improve speed of communications between egress server instance 252 and authorization network server(s) 280. By distributing a plurality of each of the ingress server instance, payment server instance, and egress server instance, continuous (active active) availability can be achieved for the payment processing provided by commerce platform server(s) while maintaining the data security and controlled information flow discussed in greater detail below.

Figure 3:
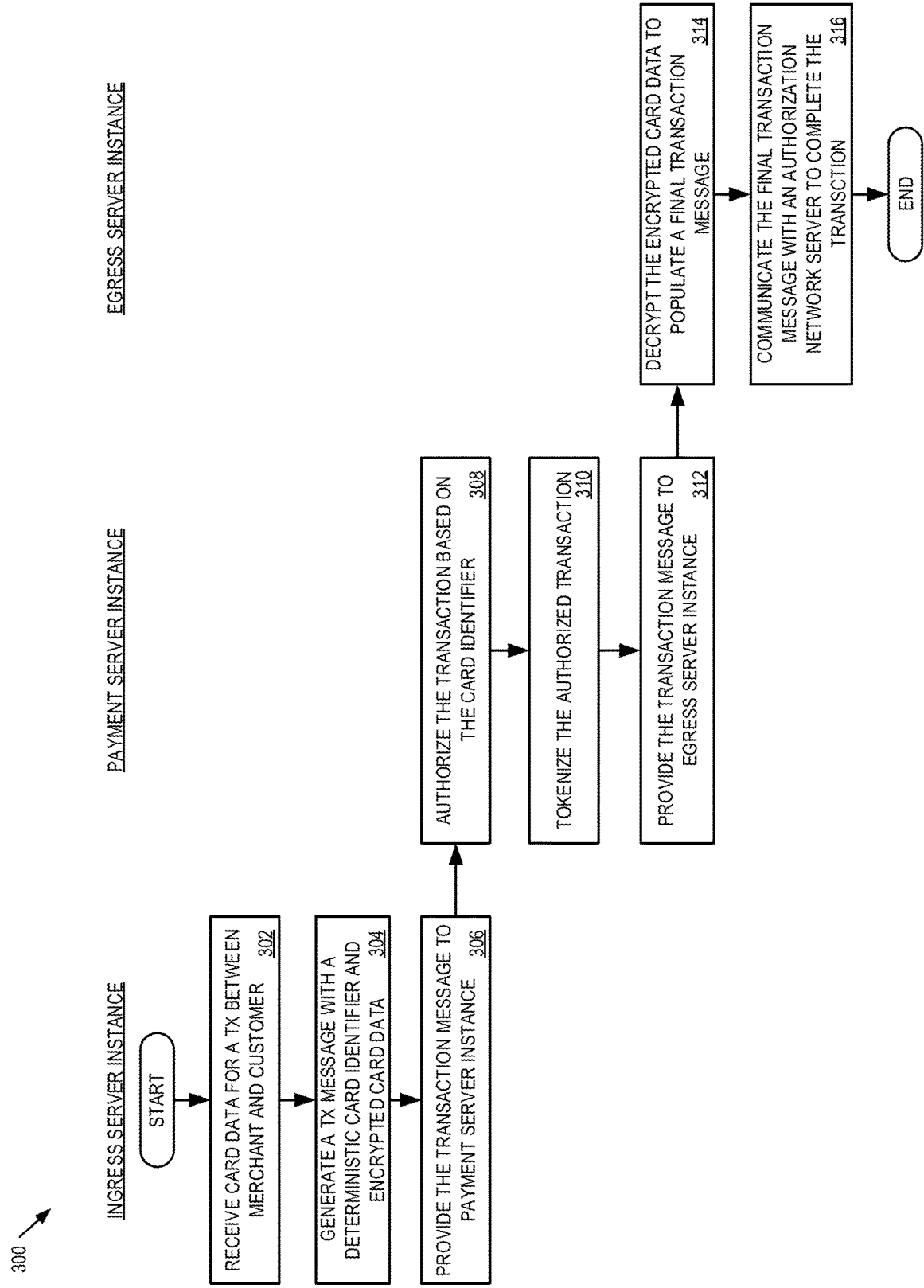
FIG. 3 is a block diagram of one embodiment of processing a card based transaction with controlled flow of network communications by an ingress server instance, a payment server instance, and an egress server instance.

FIG. 3 is a block diagram of one embodiment 300 of processing a card based transaction with controlled flow of network communications by an ingress server instance, a payment server instance, and an egress server instance. The method 300 is performed by processing logic that may comprise hardware (circuitry, dedicated logic, etc.), software (such as is run on a general-purpose computer system or a dedicated machine), firmware, or a combination thereof. In one embodiment, the method 300 is performed by instances of an ingress server, a payment server, and an egress server (e.g., an ingress server instance 212, a payment server instance 232, and an egress server instance 252 executing on processing nodes of computer system cluster(s)).

Referring to FIG. 3, processing logic begins by receiving card data for a transaction between a merchant and a customer of the merchant at an ingress server (processing block 302). In one embodiment, the transaction is a card present transaction in which the card data may be collected by a card reader used by the merchant, where the card reader provides the card data to the ingress server instance. In another embodiment, the transaction may be a card not present transaction in which card data to be used for the transaction is received by a merchant system, such as from user entry of card data (e.g., card number, expiration date, name on card, card verification value, etc.). Furthermore, as discussed herein, additional data for the transaction, such as transaction amount, transaction location, etc. may be provided by a merchant system (e.g. POS system, merchant app, etc.) for processing the transaction.

Processing logic of the ingress server instance generates a transaction message with a deterministic card identifier and encrypted card data (processing block 304). The deterministic identifier is an identifier generated from non-sensitive card data, such as the last 4 digits of the card used in the transaction, utilizing a destructive one-way function, such as a hash function. Furthermore, the sensitive card data is encrypted by processing logic of the ingress server instance upon receipt so that the sensitive data is not maintained in unencrypted form at the ingress server instance. In embodiments, a transient public key from an asymmetric encryption key pair is used by processing logic to encrypt the sensitive card data. The asymmetric encryption key pair is periodically generated by egress server instance and provided to ingress server instance, for example at boot up of ingress server instance, in periodic messaging, etc.

Processing logic of the ingress server instance provides the transaction message to payment server instance (processing block 306). In embodiments, a secure communications protocol may be used for communicating messages from ingress server instance to payment server instance. Furthermore, payment server instance only receives communications from ingress server instance for transactions, and not, for example, from a system (e.g., a merchant system) on a public network.

Processing logic of the payment server instance uses the deterministic card identifier to authorize the transaction (processing block 308). The authorization may include utilizing the deterministic identifier to query a risk management system based on factor associated with the transaction, including amount, location, etc. When authorization is successful, the transaction may be tokenized (processing block 310), and processing logic of the payment server instance provides the transaction message, along with authorization data from the risk assessment, to the egress server instance (processing block 312). Again, a secure communications protocol may be used for communicating messages from payment server instance to egress server instance.

Furthermore, egress server instance only receives communications from ingress server instance for transactions, and not, for example, from a system (e.g., a merchant system) on a public network or from ingress servers. Rather, strict communication flow is enforced by processing logic to move egress server instances, and the data maintained at egress server instances, away from public networks.

Processing logic of the egress server instance decrypts the encrypted card data to populate a final transaction message (processing block 314). In embodiments, processing logic selects one of a plurality of transient private keys based on one or more of time of transaction, identity of ingress server instance, type of transaction, etc. In one embodiment, the final transaction message is a PCI compliant message, such as an ISO 8583 message, for communicating with authorization network servers.

Processing logic of the egress server instance then communicates the final transaction message with an authorization network server (e.g., a bank server, a card issuing server, etc.) to complete the transaction between the merchant and the customer (processing block 316). In embodiments, the authorization network server will perform actions, such as checking account balances, credit limits, etc. as part of completing the transaction. When complete, a commerce platform system then informs the merchant, for example by referencing the token for the transaction, that final approval of the transaction has been cleared.

Figure 4:
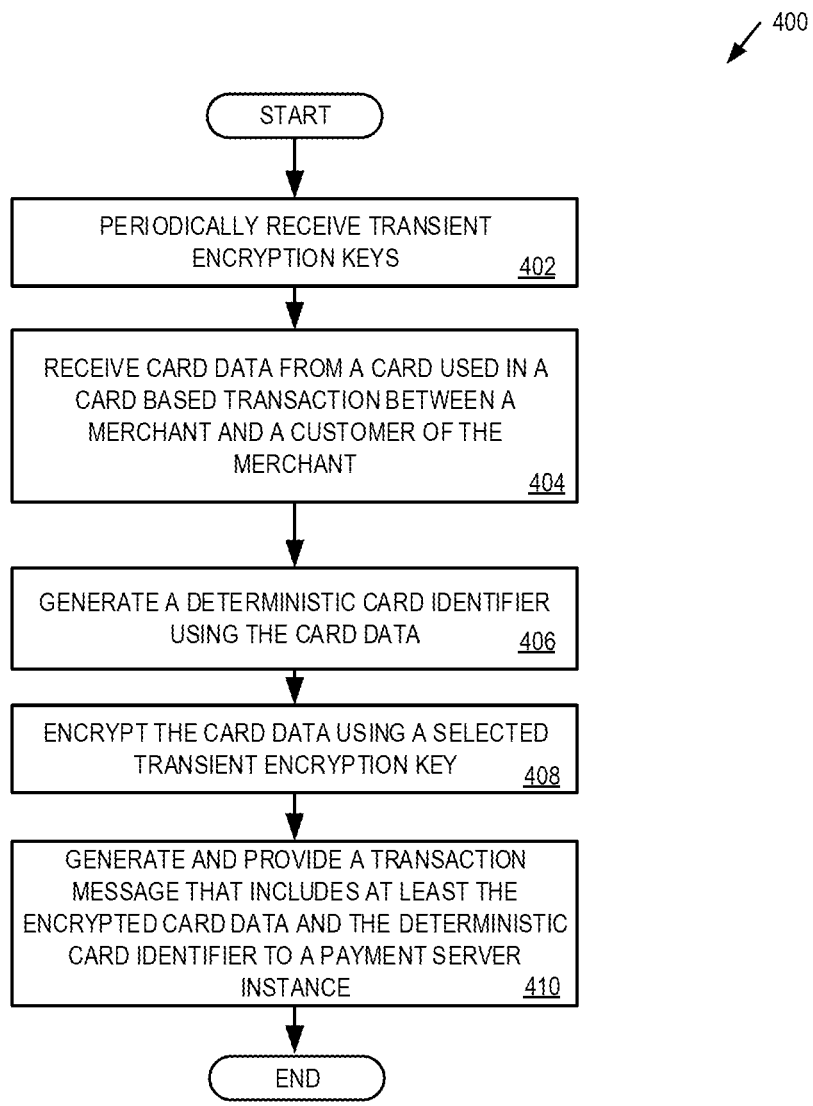
FIG. 4 is one embodiment of a process performed by an ingress server instance of a commerce platform for a card based transaction.

FIG. 4 is one embodiment of a process 400 performed by an ingress server instance of a commerce platform for a card based transaction. The method 400 is performed by processing logic that may comprise hardware (circuitry, dedicated logic, etc.), software (such as is run on a general-purpose computer system or a dedicated machine), firmware, or a combination thereof. In one embodiment, the method 400 is performed by instances of an ingress server (e.g., an ingress server instance 212 executing on processing node of a computer system cluster).

Referring to FIG. 4, processing logic begins by periodically receiving transient encryption keys (processing block 402). In embodiments, the keys are public asymmetric encryption keys, with their respective private keys maintained at one or more egress server instances. Furthermore, new transient encryption keys may be received hourly, daily, weekly, at boot up, etc. Additionally, the keys may be specific to each ingress server instance, to a region of ingress servers, to a cluster of computer systems and the ingress server instances executing thereon, etc.

Processing logic receives card data from a card used in a card based transaction between a merchant and a customer of the merchant (processing block 404). As discussed herein, the card data may be received during a card present transaction (e.g., the card data may be received from a card reader, associated with the commerce platform and used by the merchant, to collect the customer's card data at the time of a transaction), or during a card not present transaction (e.g., card data for use during the transaction is collected and/or received from a customer without the merchant or merchant's representative inspecting the customer's payment card).

Processing logic generates a deterministic card identifier using the card data (processing block 406). As discussed above, the deterministic card identifier may be generated using a destructive hash function, a set of hash functions, sets of hash functions distributed between a card reader and the ingress server instance, encryption, etc. utilizing the card's PAN and cryptographic salt selection as input to the functions. The PAN is not sensitive card data, and may therefore be used by other entities, such as an egress server instance to generate a deterministic identifier for a card used in a transaction.

After the deterministic card identifier is generated, the sensitive card data is encrypted using a selected transient encryption key (processing block 408). The key may be selected based on attributes associated with the transaction (card type, card issuer, etc.), key validity period, ingress region, ingress server instance identifier, etc.

Processing logic then generates and provides an initial transaction message that includes at least the encrypted card data and the deterministic card identifier to a payment server instance (processing block 410). In one embodiment, the message may be sent using a secure communications protocol, encrypted, or otherwise protected. Furthermore, processing logic of the ingress server instance only sends transaction messages to payment server instances, as a control on communications flow and distribution of sensitive (albeit obfuscated/encrypted) card data. Furthermore, in embodiments, a specific payment server instance may be selected by processing logic based on transaction attributes, geographic attributes about the initiation of the transaction, geographic attributes about the authorization servers that will complete a transaction, legal requirements, etc.

Figure 5:
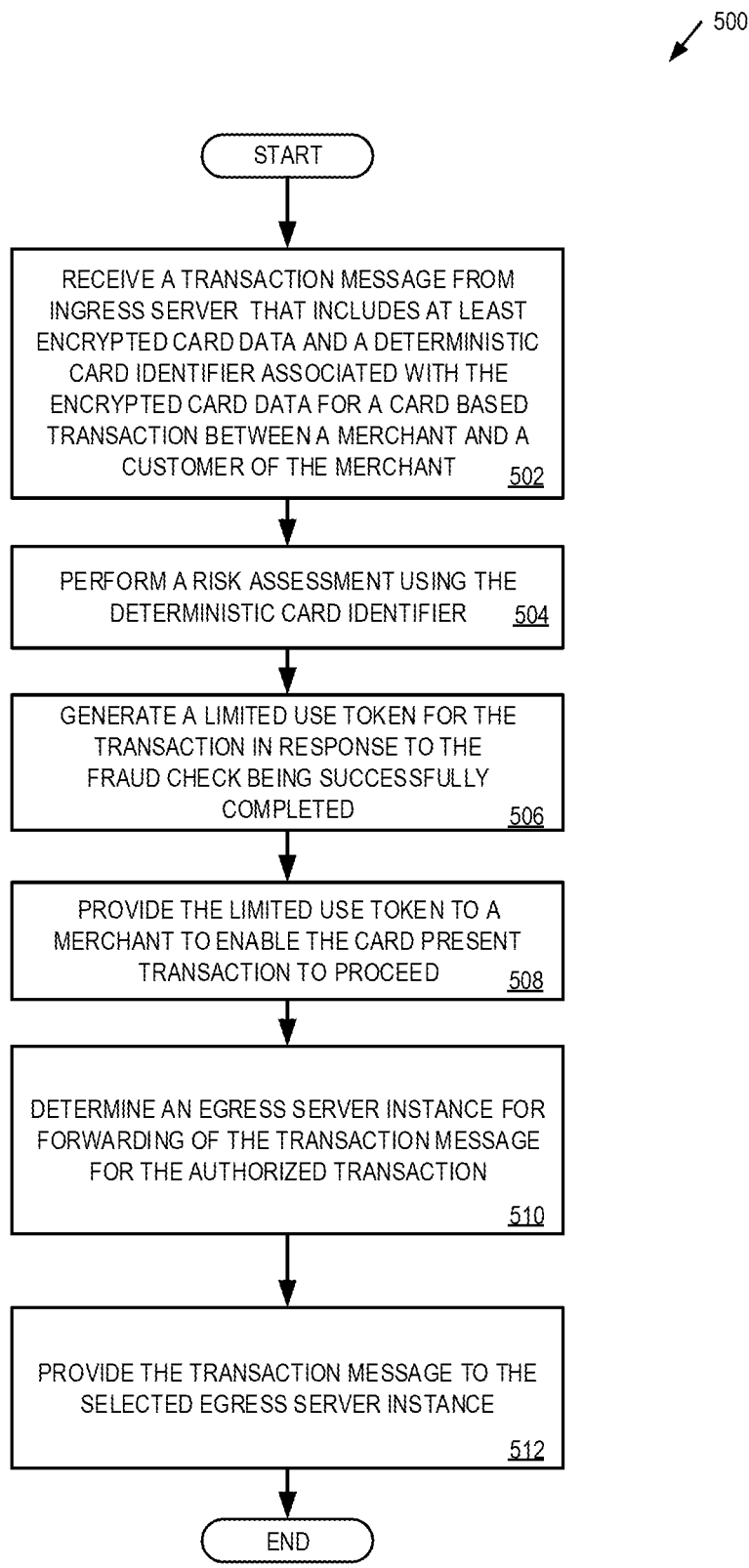
FIG. 5 is one embodiment of a process performed by a payment server instance of a commerce platform for a card based transaction.

FIG. 5 is one embodiment of a process 500 performed by a payment server of a commerce platform for a card based transaction. The method 500 is performed by processing logic that may comprise hardware (circuitry, dedicated logic, etc.), software (such as is run on a general-purpose computer system or a dedicated machine), firmware, or a combination thereof. In one embodiment, the method 500 is performed by instances of a payment server (e.g., a payment server instance 232 executing on processing node of a computer system cluster).

Referring to FIG. 5, processing logic begins by receiving a transaction message from an ingress server that includes at least encrypted card data and a deterministic card identifier associated with the encrypted card data for a card based transaction between a merchant and a customer of the merchant (processing block 502). The message may include additional data, such as originating region of a transaction, issuing bank, card type, card brand, etc., and attributes of the transaction, such as amount.

Processing logic then performs a risk assessment using the deterministic card identifier (processing block 504). As discussed herein, transaction data is analyzed using the deterministic card identifier by a risk assessment system to detect fraud prior to authorizing a transaction. When risk assessment does not detect fraud, processing logic further generates a limited use token for the transaction (processing block 506), which in embodiments is provided to the merchant from the payment server instance (processing block 508). As discussed herein, the token is used by a commerce platform and merchant system(s) as a reference to the transaction, without the need to include card data, thereby enabling the merchant to track the transaction, receive remuneration, operate rewards systems, etc. without triggering PCI compliance regulations.

Processing logic of the payment server instance then determines an egress server instance for forwarding of the transaction message for the authorized transaction (processing block), and forwards the transaction message to the selected egress server instance (processing block 512). In embodiments, factor such as geography of authorization network server(s), geography of card issuer/bank, etc. may be used as factors in selecting among a plurality of different egress server instances for completing a transaction between the merchant and the customer. These selections may be done based on legal requirements (e.g., egress is performed at a geographic region specified for the transaction and/or card), to reduce latency (e.g., egress is performed by a cluster of computer systems proximate to an authorization server), or any other selection criteria. Furthermore, processing logic of the payment server instance only communicates the transaction message to egress servers, again enforcing strict communication flows to provide for improved communication security.

Figure 6:
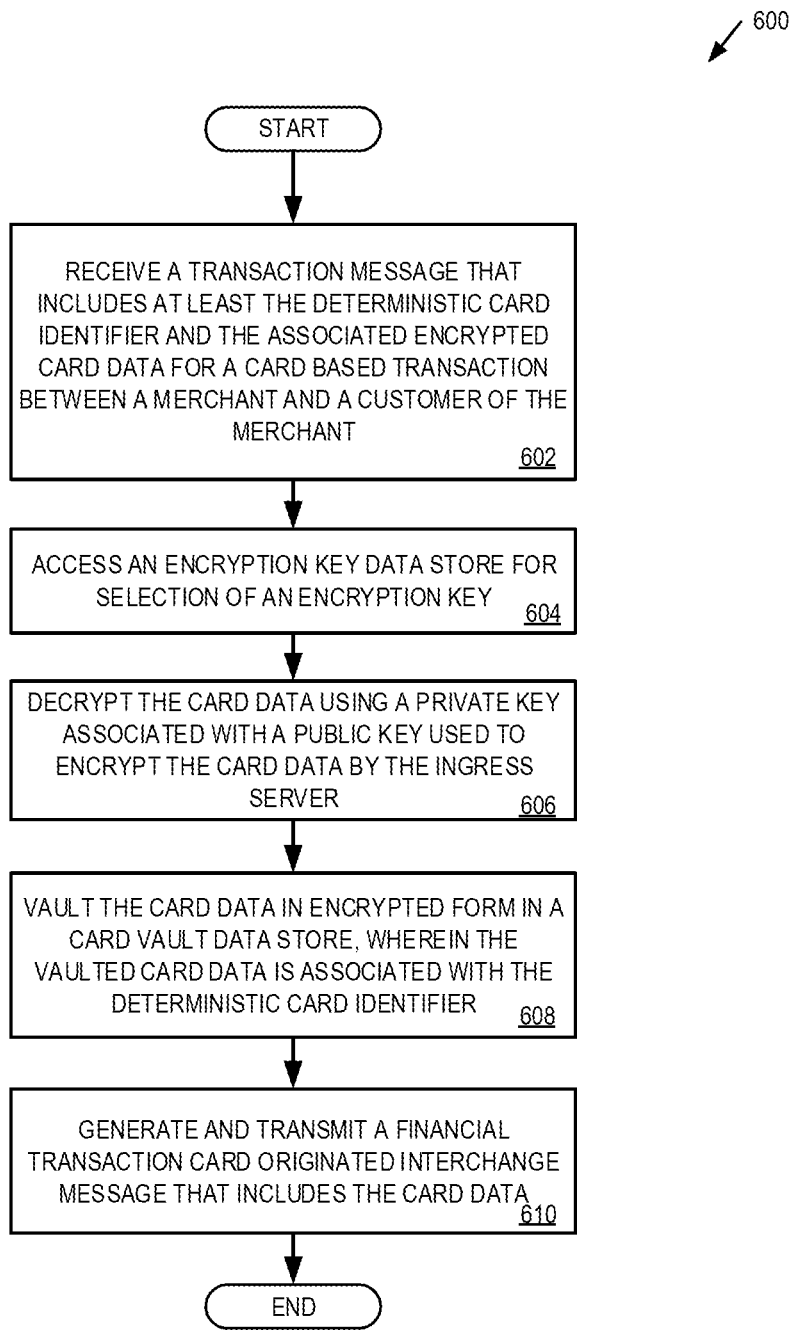
FIG. 6 is one embodiment of a process performed by an egress server instance of a commerce platform for a card based transaction.

FIG. 6 is one embodiment of a process 600 performed by an egress server instance of a commerce platform for a card based transaction. The method 600 is performed by processing logic that may comprise hardware (circuitry, dedicated logic, etc.), software (such as is run on a general-purpose computer system or a dedicated machine), firmware, or a combination thereof. In one embodiment, the method 600 is performed by instances of an egress server (e.g., an egress server instance 252 executing on processing node of a computer system cluster).

Referring to FIG. 6, processing logic begins by receiving a transaction message from a payment server instance that includes at least encrypted card data and a deterministic card identifier associated with the encrypted card data for a card based transaction between a merchant and a customer of the merchant (processing block 602). The transaction messages, as discussed herein, may include card and transaction metadata, such as card type, issuer, transaction amount, originating region, risk assessment authorization, ingress server instance identifier, etc.

In embodiments, processing logic utilizes the data in the transaction message to access an encryption key data store for selection of an encryption key (processing block 604). For example, certain keys are distributed to certain ingress server instances, and thus ingress server instance identifiers are used to select the appropriate private asymmetric key for decrypting the encrypted content in the received transaction message. Similarly, timing data in the transaction message may be used to determine a key validity period for selection of the appropriate private asymmetric key for decrypting the encrypted content in the received transaction message. Other factors for selecting an appropriate decryption key may be performed consistent with the discussion herein.

Processing logic vaults the card data in encrypted form in a card vault data store, wherein the vaulted card data is associated with the deterministic card identifier (processing block 608). In embodiments, card data is maintained by egress server instance in secure/encrypted form, and is accessible via the associated deterministic card identifier. By maintain the card data, the efficiency of later transactions, such as follow on transactions of a different type (e.g., card not present), may be improved.

Processing logic then generates and transmits a financial transaction card originated interchange message that includes the card data (processing block 610). In one embodiment, the message is a PCI compliant ISO 8583 message, or other PCI compliant message, for communicating with authorization network server(s). In embodiments, as discussed herein, the egress server instance only receives transaction communications from payment server instances, and only transmits transaction messages to authorization server(s). Thus, transaction message flow is again limited and strictly controlled using the techniques discussed herein. Furthermore, the sensitive data is protected from access by a device on a public network, as public network communications by an egress server are no expected and/or allowed.

Figure 7:
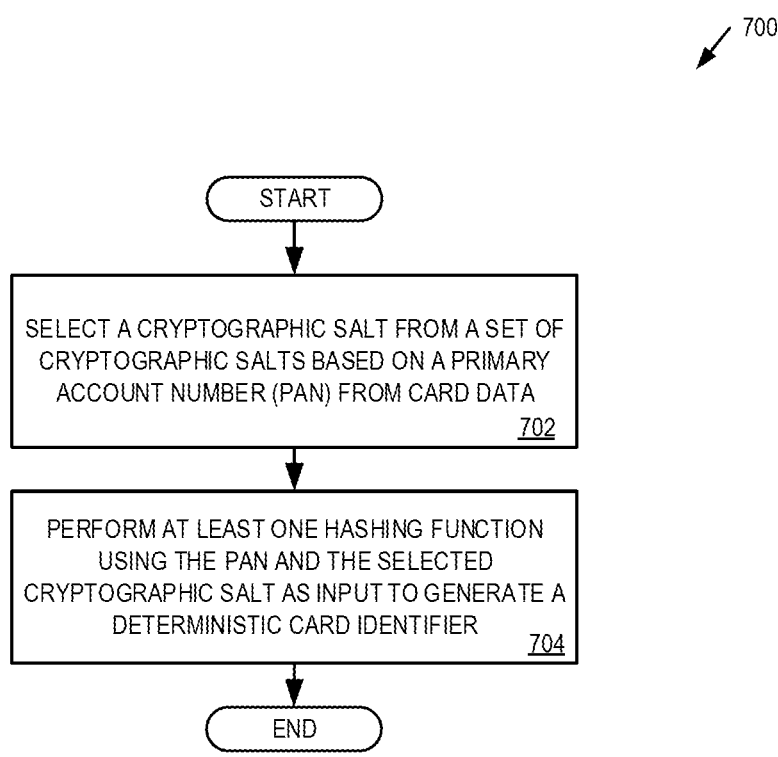
FIG. 7 is one embodiment of a process for generation of a deterministic card identifier by a commerce platform for use during a card based transaction and other transactions.

FIG. 7 is one embodiment of a process for generation of a deterministic card identifier by a commerce platform for use during a card based transaction and other transactions. The method 700 is performed by processing logic that may comprise hardware (circuitry, dedicated logic, etc.), software (such as is run on a general-purpose computer system or a dedicated machine), firmware, or a combination thereof. In one embodiment, the method 700 is performed by instances of an ingress server (e.g., an ingress server instance 212 executing on processing node of a computer system cluster). However, other systems, such as egress servers, or other systems of a commerce platform, may generate a deterministic card identifier as discussed herein.

Referring to FIG. 7, processing logic begins by selecting a cryptographic salt from a set of cryptographic salts based on a primary account number (PAN) from card data (processing block 702). The card data including the PAN, in embodiments, may be collected during a card present or card not present transaction. Furthermore, as discussed herein, the cryptographic salts are a set of random data used as additional data when performing one-way functions, such as destructive hashing functions. In one embodiment, the PAN is used to select among the available salts.

Processing logic performs at least one hashing function using the PAN and the selected cryptographic salt as input (processing block 704). In one embodiment, as discussed herein, the one or more hashing functions can include performing $f_{hash}(PAN, f_{salt}(PAN))$ to generate the deterministic identifier using a hash function and a salt selection function. In another embodiment, a recursive hashing technique may also be used, where processing logic performs $f_{h0 \to i}(PAN, f_{salt}(PAN))$ to recursively perform I recursive hashing operations using the hash function and the salt selection function. In yet another embodiment, a recursive and distributed hashing function may be employed such that a card reader may perform an initial set of hashing, such as $f_{h0 \to m}(PAN, f_{salt}(PAN)) = identifier_{initial}$, and processing logic performs additional hashing, such as $f_{hm \to n}(identifier_{initial})$, where m and n are predefined integers greater than 0. Although hashing is described above, any one-way function where the input (e.g., the PAN) cannot be regenerated from the output of the function can be used by processing logic. In embodiments, encryption may also be used in addition to the hashing, including a reader encrypt card data and/or the distributed deterministic identifier to further obfuscate this data until it enters a trusted environment (e.g., an ingress server instance).

FIG. 8 is one embodiment of a computer system that may be used to support the systems and operations discussed herein. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

FIG. 9 is a block diagram of one embodiment of a reader device. Reader device 900 provides additional details for the reader devices (e.g., reader device 115) discussed herein. Examples of reader device 900 include Verifone™ PIN pad devices, such as the VX 820, P400, P200, as well as other PIN pad reader devices offered by Verifone and other manufacturers of such devices. Additional examples reader device 900 include mobile reader devices, such as a BBPOS™ Chipper™, as well as mobile reader devices offered by BBPOS™ and other manufacturers of such devices.

In one embodiment, the reader device 900 is a system, which may include a combination of one or more processor(s) 904, a memory 906, network interface 908, and card reader(s) 902 (e.g., magnetic stripe readers, chip readers, etc.). Reader device 900 may also include a number of processing modules, which may be implemented as hardware, software, firmware, or a combination. It should be appreciated that reader device 900 may also include, although not illustrated, a user interface (e.g., keyboard, touch-screen, buttons, or similar user input devices), a power device (e.g., a battery), as well as other components typically associated with electronic devices. Network interface 908 of reader device may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

Memory 906 may be coupled to processor(s) 904 in reader device to store instructions for execution by processor(s). In some embodiments, memory is non-transitory. It should be appreciated that embodiments as described herein may be implemented through the execution of instructions, for example as stored in the memory or other element, by processor(s) of the reader devices and/or other circuitry of the reader devices. Particularly, circuitry of the reader device, including but not limited to processor and card reader, may operate under the control of a program, routine, or the execution of instructions to execute methods or processes in accordance with the embodiments described herein. For example, such a program may be implemented in firmware or software (e.g. stored in memory and/or other locations) and may be implemented by processors, such as processor and card reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

It will be appreciated by those of ordinary skill in the art that any configuration of the system may be used for various purposes according to the particular implementation. The control logic or software implementing the described embodiments can be stored in main memory, mass storage device, or other storage medium locally or remotely accessible to processor.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for reducing latency of authorization during processing of a network operation in a distributed network system comprising an ingress server, a server, and a plurality of egress servers, the method comprising:
receiving, by the server of the distributed network system, a network operation message from the ingress server of the distributed network system, the network operation message comprising:
encrypted data of a customer,
a deterministic card identifier associated with the encrypted data for the network operation between a merchant and the customer of the merchant, the deterministic card identifier generated by applying a cryptographic function on data of the customer and a cryptographic salt selected based on the data, the deterministic card identifier used to index the encrypted data in a vault data store, and
one or more network operation attributes;

performing, by the server, an analysis based on the one or more network operation attributes and the deterministic card identifier to detect network operation fraud;

in response to detection of a legitimate network operation based on the analysis, authorizing, by the server, the network operation;

in response to authorizing the network operation, generating, by the server, a token to reference the network operation in the distributed network system, wherein the token is a non-sensitive data element;

causing, by the server, transmission of the token to a merchant server to initiate the authorized network operation;

performing, by the server, load balancing across the plurality of egress servers of the distributed network system;

selecting, by the server, an egress server among the plurality of egress servers of the distributed network system to which the network operation message for the authorized network operation is to be transmitted based on at least a geographical location of the egress server in relation to an authorization server and performance of the load balancing across the plurality of egress servers, such that a latency in transmitting the network operation message is reduced and the distributed network system is continuously available;

transmitting, by the server to the selected egress server, the network operation message for the authorized network operation to cause the selected egress server to decrypt the encrypted data for storage in the vault store and communicate the token with the merchant server to clear the authorized network operation; and wherein communications originating from outside the distributed network system are blocked to prevent access to the selected egress server.

2. The method of claim 1, wherein the encrypted data is obtained from the customer for the network operation between the merchant and the customer, and the encrypted data is not exposed to the server in unencrypted form.

3. The method of claim 1, wherein in response to a detection of the legitimate network operation based on the analysis, the method further comprises:
generating, by the server, a token that identifies the network operation; and
transmitting, by the server, the token to one or more of the merchant and the ingress server.

4. The method of claim 1, wherein the egress server is selected based on:
a geographic proximity between an authorization network server and the selected egress server,
a geography of card issuer/bank,
a legal requirement for the network operation and/or card associated with a geographic region in which egress of a final network operation message will occur, or
a combination thereof.

5. The method of claim 1, wherein the distributed network system comprises a plurality of ingress servers including the ingress server, a plurality of servers including the server, and a plurality of egress servers including the egress server, and the distributed network system is continuously active architecture for providing network operation processing services in event of a failure of one or more of the plurality of ingress servers, servers, and/or egress servers.

6. The method of claim 1, wherein the one or more network operation attributes comprise originating region of the network operation, issuing bank, card type, card brand, and network operation amount.

7. The method of claim 1,
wherein network operation messages that do not originate from ingress servers of the distributed network system, and electronic communications originating from a public network are blocked from being sent to the server; and
wherein network operation messages for authorized network operations that do not originate from within the distributed network system, and electronic communications originating from the public network are blocked from being sent to the egress server.

8. The method of claim 7, wherein rejection of messages and electronic communications by the server and the egress server enforce a strict flow of communications within the distributed network system.

9. The method of claim 1, wherein the network operation is a card present network operation or a card not present network operation.

10. The method of claim 1, wherein communications exchanged between the ingress server and the server, and communications exchanged between the server and the egress server, are each transmitted using a secure communications protocol.

11. A non-transitory computer readable storage medium including instructions that, when executed by a plurality of processors of a distributed processing system comprising an ingress server, a server, and a plurality of egress servers, cause the plurality of processors to perform operations for reducing latency of authorization during processing of a network operation in the distributed processing system, the operations comprising:
receiving, by the server of the distributed processing system, a network operation message from the ingress server of the distributed processing system, the network operation message comprising:
encrypted data of a customer,
a deterministic card identifier associated with the encrypted data for the network operation between a merchant and the customer of the merchant, the deterministic card identifier generated by applying a cryptographic function on data of the customer and a cryptographic salt selected based on the data, the deterministic card identifier used to index the encrypted data in a vault data store, and
one or more network operation attributes;
performing, by a detection system of the server, an analysis based on the one or more network operation attributes and the deterministic card identifier to detect network operation fraud;
in response to detection of a legitimate network operation based on the analysis, authorizing, by the server, the network operation;
in response to authorizing the network operation, generating, by the server, a token to reference the network operation in the distributed network system, wherein the token is a non-sensitive data element;
causing, by the server, transmission of the token to a merchant server to initiate the authorized network operation;
performing, by the server, load balancing across the plurality of egress servers of the distributed network system;
selecting, by the server, an egress server among the plurality of egress servers of the distributed processing system to which the network operation message for the authorized network operation is to be transmitted based on at least a geographical location of the egress server in relation to an authorization server and load balancing across the plurality of egress servers, such that a latency in transmitting the network operation message is reduced and the distributed network system is continuously available;

transmitting, by the server to the selected egress server, the network operation message for the authorized network operation to cause the selected egress server to decrypt the encrypted data for storage in the vault store and communicate the token with the merchant server to clear the authorized network operation; and wherein communications originating from outside the distributed network system are blocked to prevent access to the selected egress server.

12. The non-transitory computer readable storage medium of claim 11, wherein the encrypted data is obtained from the customer for the network operation between the merchant and the customer, and the encrypted data is not exposed to the server in unencrypted form.

13. The non-transitory computer readable storage medium of claim 11, wherein the distributed processing system comprises a plurality of ingress servers including the ingress server, a plurality of payment servers including the server, and a plurality of egress servers including the egress server, and the distributed processing system is a continuously active architecture for providing processing services in event of a failure of one or more of the plurality of ingress servers, servers, and/or egress servers.

14. A distributed processing system for reducing latency of authorization during processing of a network operation, comprising:
a server comprising at least one processor coupled with memory configured to:
receive a network operation message from an ingress server of the distributed processing system, the network operation message comprising:
encrypted data of a customer,
a deterministic card identifier associated with the encrypted data for a network operation between a merchant and the customer of the merchant, the deterministic card identifier generated by applying a cryptographic function on data of the customer and a cryptographic salt selected based on the data, the deterministic card identifier used to index the encrypted data in a vault data store, and
one or more network operation attributes,
perform, by a detection system of the server, an analysis based on the one or more network operation attributes and the deterministic card identifier to detect network operation fraud;
in response to detection of a legitimate network operation based on the analysis, authorize the network operation;
in response to authorizing the network operation, generate a token to reference the network operation in the distributed network system, wherein the token is a non-sensitive data element;
cause transmission of the token to a merchant server to initiate the authorized network operation;
perform load balancing across the plurality of egress servers of the distributed network system;
select an egress server among a plurality of egress servers of the distributed processing system to which the network operation message for the authorized network operation is to be transmitted based on at least a geographical location of the egress server in relation to an authorization server and performance of load balancing across the plurality of egress servers, such that a latency in transmitting the network operation message is reduced and the distributed network system is continuously available;
transmit, to the selected egress server, the network operation message for the authorized network operation to cause the selected egress server to decrypt the encrypted data for storage in the vault store and communicate the token with the merchant server to clear the authorized network operation; and
wherein communications originating from outside the distributed network system are blocked to prevent access to the selected egress server.

15. The method of claim 1, wherein the distributed network system is executed across a plurality of computing clusters, and
wherein performing the load balancing further comprises performing the load balancing across the plurality of computing clusters, and
wherein selecting the egress server further comprises selecting, from the plurality of computing clusters, a computing cluster including the egress server based on at least the geographical location of the computing cluster and performance of load balancing across the plurality of computing clusters.

16. The non-transitory computer readable storage medium of claim 11, wherein the distributed network system is executed across a plurality of computing clusters, and
wherein performing the load balancing further comprises performing the load balancing across the plurality of computing clusters, and
wherein selecting the egress server further comprises selecting, from the plurality of computing clusters, a computing cluster including the egress server based on at least the geographical location of the computing cluster and performance of load balancing across the plurality of computing clusters.

17. The distributed processing system of claim 14, wherein the server is further configured to:
perform the load balancing across a plurality of computing clusters executing the plurality of egress servers; and
select, from the plurality of computing clusters, a computing cluster including the egress server based on at least the geographical location of the computing cluster and performance of load balancing across the plurality of computing clusters.

* * * * *